(No Model.)

DeW. C. PUTNAM.
Breaking Cart.

No. 232,207. Patented Sept. 14, 1880.

Witnesses
Geo. H. Strong.
Frank A. Brooks.

Inventor
DeWitt C. Putnam
By Dewey & Co.
Att'ys

UNITED STATES PATENT OFFICE.

DE WITT C. PUTNAM, OF PETALUMA, CALIFORNIA.

BREAKING-CART.

SPECIFICATION forming part of Letters Patent No. 232,207, dated September 14, 1880.

Application filed May 22, 1880. (No model.)

*To all whom it may concern:*

Be it known that I, DE WITT C. PUTNAM, of Petaluma, county of Sonoma, and State of California, have invented an Improved Breaking-Cart; and I hereby declare the following to be a full, clear, and exact description thereof.

My invention relates to certain improvements in that class of vehicles known as "breaking-carts," in which young colts are broken to harness.

Carts of this description are usually provided with very long shafts, and the seat is placed on springs immediately over the axle, or at such a distance back that the driver is not in danger of being kicked by a fractious animal. In this class of vehicles the foot-board is usually secured to the axle, while the seat is on springs, and it is therefore uncomfortable to ride upon, since while the body of the occupant may move up and down his feet must remain stationary.

My improvements consist in so attaching the foot-board to the vehicle that it shall move in unison with the seat, the same spring which supports the seat serving as a spring for the foot-board, as is more fully described in the accompanying drawings, in which—

Figure 1:
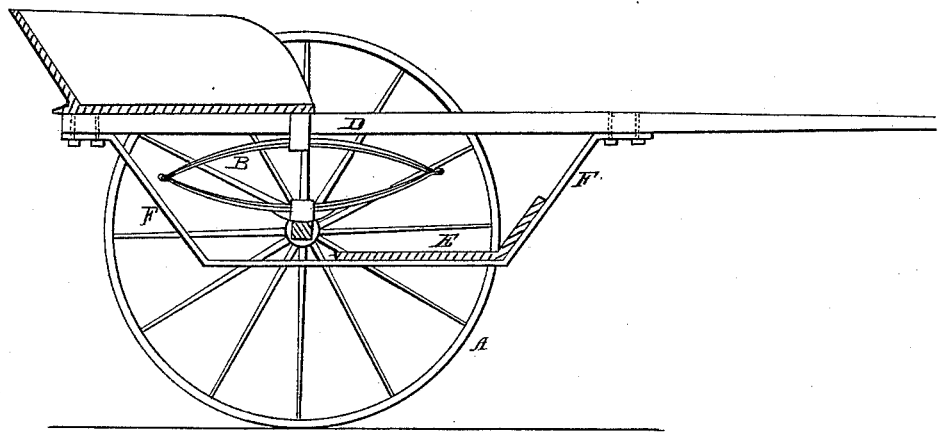
Figure 2:
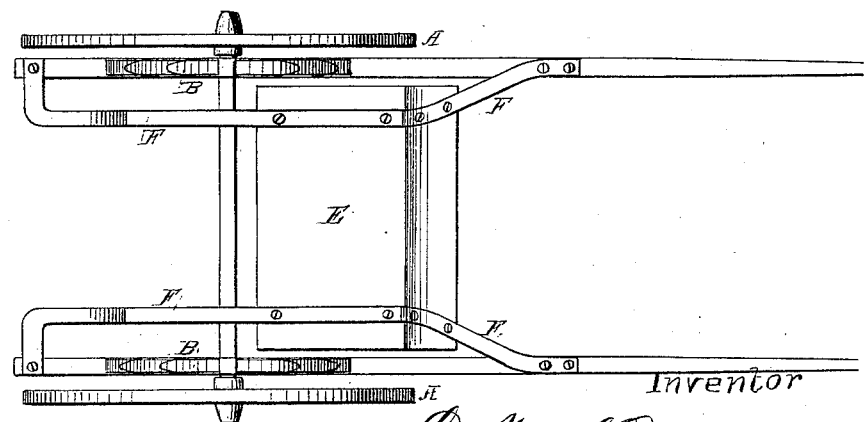

Figure 1 is a longitudinal section of my device. Fig. 2 is a bottom view.

Breaking-carts usually have two wheels, A, only, and the springs B are secured both to the axle C and the shafts D, said shafts being secured on the springs in the manner shown.

In order to attach the foot-board E to the vehicle, I place metallic straps or bands F in a proper position to hold the foot-board, connecting these straps with the shafts and seat, and not with the axle. I have shown the straps connected with the shafts at the rear ends of and forward of the whiffletree-bar.

It will be seen by this construction that the rear ends of the shafts and the seat are supported upon the spring B, while the straps F pass beneath the axle and are bent up, so that their rear and their front ends are secured to the shafts at points behind and in front of the axle, while the central portion does not touch it at all. The foot-board E, with its turned-up front portion, is then secured upon the bottom and front portions of the straps F. Being thus entirely independent of any direct connection with the axle, it will have the same movement imparted to it by the action of the spring that the shafts have, and it will have none of the unpleasant jar that a stationary foot-board or one supported from the axle will have, while the arrangement of the straps parallel with the shafts facilitates the attachment of the transverse foot-board and makes a strong construction.

Having thus described my invention, what I claim as new, and desire to secure by Letters Patent, is—

The braces or straps F, having their ends secured to the shafts before and behind the axle, while the central portion extends beneath the axle and parallel with the shafts, and is adapted to support the transverse foot-board E, substantially as and for the purpose herein described.

In witness whereof I have hereunto set my hand.

D. W. C. PUTNAM.

Witnesses:
S. H. NOURSE,
FRANK A. BROOKS.